Aug. 16, 1938. C. M. EASON 2,126,760
CLUTCH
Filed Dec. 28, 1936 4 Sheets-Sheet 1

Inventor,
Clarence M. Eason

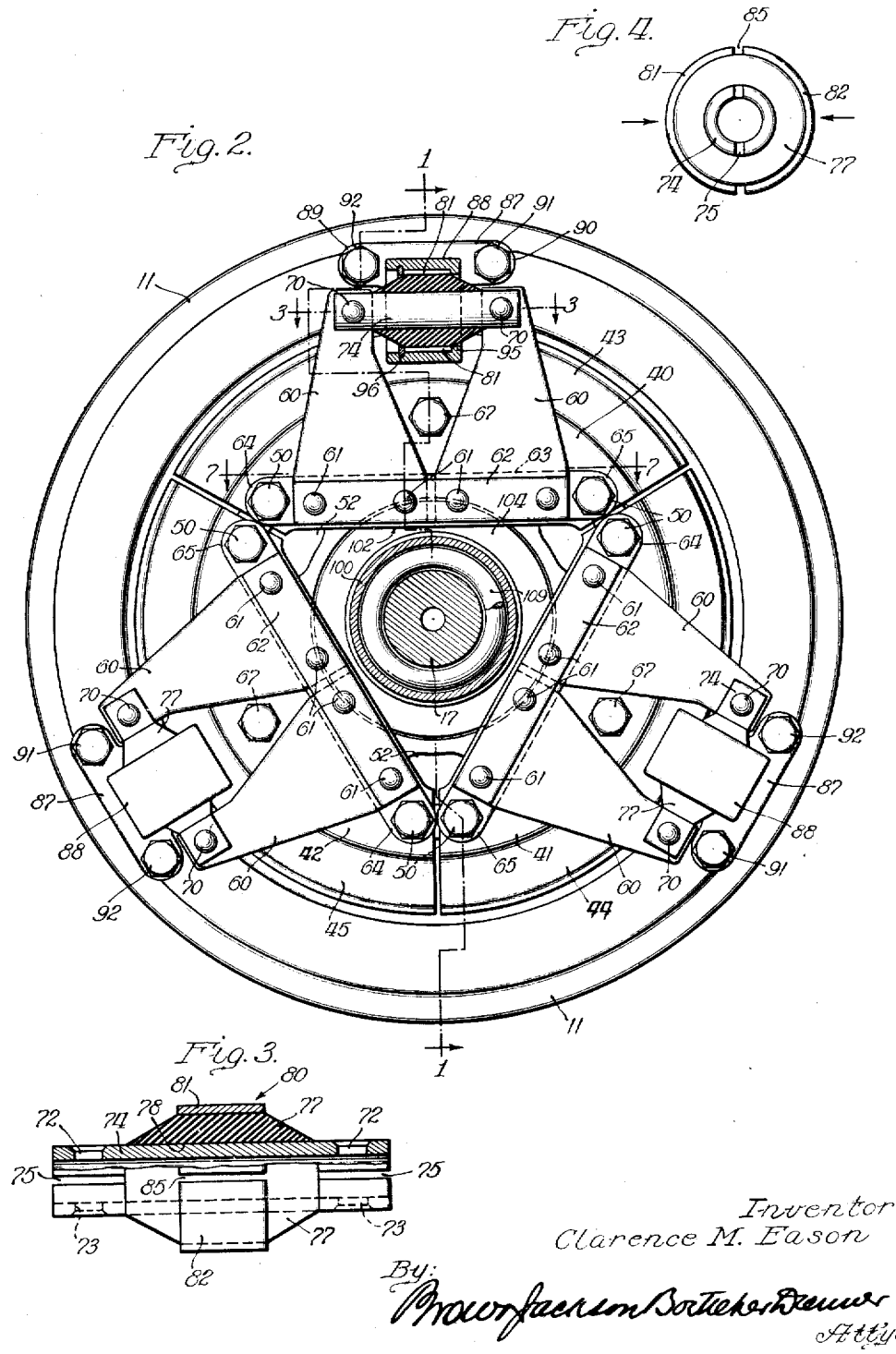

Aug. 16, 1938.　　　　C. M. EASON　　　　2,126,760
CLUTCH
Filed Dec. 28, 1936　　　　4 Sheets-Sheet 3
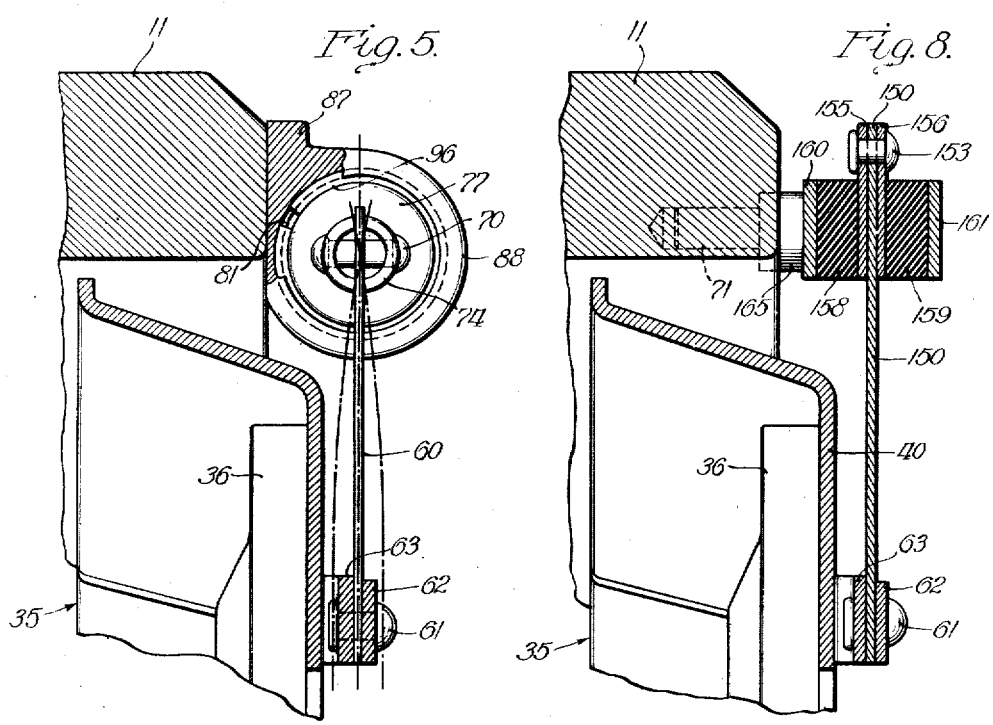
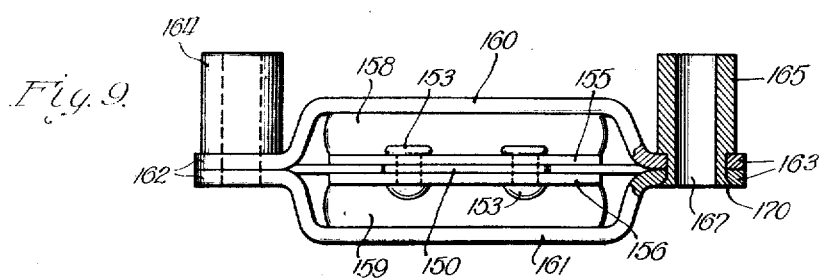
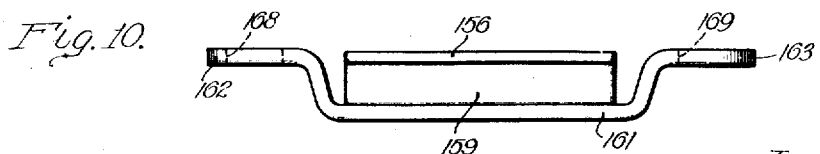
Inventor:
Clarence M. Eason Inventor:
Clarence M. Eason Patented Aug. 16, 1938

2,126,760

UNITED STATES PATENT OFFICE 2,126,760

CLUTCH

Clarence M. Eason, Waukesha, Wis., assignor to Industrial Clutch Company, a corporation of Wisconsin Application December 28, 1936, Serial No. 117,809

28 Claims. (Cl. 192—66)

The present invention relates generally to power transmission clutches arranged to connect and disconnect a power take-off shaft for industrial uses, although in its broader aspects the present invention is concerned with power clutches for any suitable use, whether industrial, automotive, or any other service.

The principal object of the present invention is the provision of a clutch mechanism wherein there is no possibility that any misalignment, whether axial, radial, or otherwise, between the driving and driven elements connected by the clutch can exert any appreciable force tending to cause any relative movement between the clutch members when the latter are engaged. It is recognized that when two members, such as a flywheel and a driven shaft, are to be connected together by suitable clutch mechanism, it is practically impossible to support these driving and driven parts without having some misalignment develop, and where the clutch mechanism connecting such parts comprises a member carried on one element and another member carried on the other element, any misalignment between the driving and driven elements stresses the clutch parts and tends materially to shorten the life of the clutch. This is particularly true of a cone clutch, and the present invention is especially concerned with clutches of this type. Another object of the present invention is the provision of a cone clutch mechanism that embodies conical driving and driven clutch members, with one member rigidly fixed to one of the driving and driven elements while the other clutch member is loosely or resiliently mounted with respect to both elements, and particularly with respect to the element other than the driving and driven element to which the first mentioned clutch member is rigidly fixed. More specifically, it is an object of the present invention to provide a cone clutch embodying relatively movable members with one fixed to the driven shaft while the other is not only axially shiftable with respect thereto but is connected to the driving element by resilient torque transmitting means that permits the clutch member so carried to move relative to the driving element while transmitting the drive from the latter to the driven shaft and at the same time to move absolutely as a unit with the other clutch member whereby it is impossible for any misalignment between the driving element and the driven shaft to cause any tendency for relative movement to take place between the clutch members when they are in engaged power transmitting relation.

A further object of the present invention is the provision of a cone clutch mechanism that embodies what might be termed a floating driving clutch member in that the driving member of the clutch is connected to the driving element of the mechanism by suitable resilient torque transmitting means, permitting relative movement to occur between the clutch member and the driving element even during periods when full power is transmitted through these parts, and in which the mechanism for holding the clutch member frictionally and firmly engaged with the companion clutch member is also so connected with the first mentioned clutch member as to accommodate relative movement.

Another important object of the present invention is the provision of a clutch member that is resiliently connected with a driving element by one or more resilient plates connected at their inner ends to the clutch member and at their outer ends to the driving element through the medium of rubber bushings arranged in a generally circumferential direction and adapted to transmit the driving torque by the strength of the rubber in shear and, furthermore, cooperating with the resilient plates in permitting, while in torque transmitting relation, the clutch member to move relative to the driving element in order to accommodate any misalignment between the driving and the driven elements. A particular advantage of employing rubber in shear in this manner is that every portion of the rubber bushing is utilized and is stressed uniformly during periods of operation.

Another object of the present invention is the provision of a cone clutch mechanism having the driving member thereof flexibly connected to the flywheel or driving element of the source of power, and a further object of the present invention in this connection is the provision of means making it possible to detach the clutch mechanism without releasing the loading spring.

Another feature of this invention is the provision of a cone clutch mechanism disposed principally in the recess of the driving flywheel to which the clutch is flexibly connected. A further feature of this invention is the provision of spring loading means for the clutch that is so connected as to be relieved of twisting strains and the like while the clutch parts are being brought into engagement. Still another feature of the invention is the disposition of the loading spring means for the clutch within the sleeve which shifts the movable clutch member, particularly in connection with means for causing the sleeve to rotate with the driven shaft.

These and other objects and advantages of the present invention will be apparent to those skilled in the art after a consideration of the following detailed description of the preferred structures, taken in conjunction with the accompanying drawings.

In the drawings:

Figure 2 is a view taken substantially along the line 2—2 of Figure 1 and looking in the direction of the arrows;

Figure 3 is a section taken along the line 3—3 of Figure 2 on an enlarged scale, illustrating the construction of one of the rubber bushings that are disposed in generally circumferentially extending position and serving to connect the driving clutch part with the flywheel or other driving element of the source of power;

Figure 4 is an end view of one of the rubber bushings before the rubber insert has been subjected to initial compression;

Figure 5 is an enlarged fragmentary section, similar to Figure 1, illustrating the manner in which the driving clutch member is connected to the driving element of the source of power by resilient torque transmitting means accommodating relative movement between the driving clutch member and the driving element;

Figure 8 is a section taken along the line 8—8 of Figure 6;

Figure 9 is an enlarged plan view of one of the rubber bushings connecting the driving clutch member to the driving element in the form of the invention shown in Figure 6; and Figure 10 is a view of one of the two elements making up the rubber bushing connection shown in Figure 9.

Figure 1:
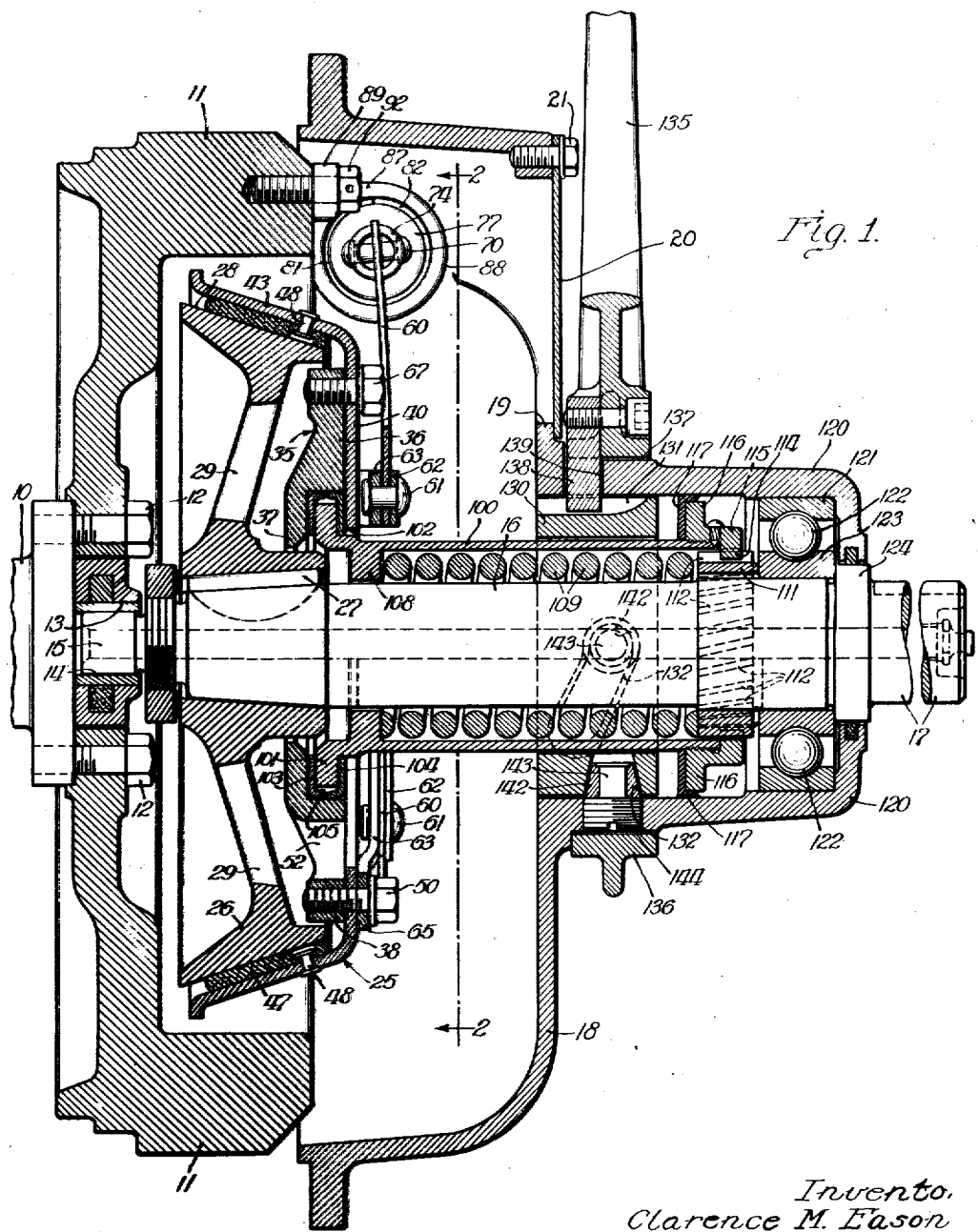
Figure 1 is a vertical longitudinal section taken through a power take-off clutch mechanism embodying the principles of the present invention, Figure 1 being a section taken substantially along the line 1—1 of Figure 2.

Referring now to the drawings, and more particularly Figures 1 and 2, the principles of the present invention have been illustrated in this case as embodied in an industrial clutch unit in the nature of the power take-off device adapted to derive power from any convenient source, such as an engine driven crank shaft 10 carrying a driving element in the form of a flywheel 11 suitably secured to the driving flange of the crank shaft 10 by stud bolts 12. This end of the crank shaft 10 carries a reduced recessed section 13 in which a bushing 14 is disposed and which receives the reduced end 15 of a driven shaft 16, the outer end 17 of which extends outwardly beyond a casing 18 enclosing the clutch unit, the end 17 of the driven shaft being adapted to receive a gear, a pulley, or other instrumentality adapted to receive the power transmitted by the clutch unit from the driving element 11. The housing 18 is provided with a hand hole 19 covered by a plate 20 that is detachably secured in place by one or more cap screws 21.

The clutch proper is indicated in its entirety in Figure 1 by the reference numeral 25 and includes a driven clutch member 26 fixed, as by a key 27, to the forward or inner end of the driven shaft 16. The member 26 is preferably in the form of a casting and is provided with a conical friction surface 28, forming the male member of the cone clutch 25. The casting 26 is preferably of spoked construction, or of a construction embodying openings 29 providing for a free circulation of air through the unit to keep the clutch from heating. The driving member of the clutch is indicated by the reference numeral 35 and comprises a central hub section 36 having a radially inwardly disposed flange 37 and radially outwardly disposed sections 38. The radially outer portions of the driving clutch member 35 are preferably in the form of a plurality, usually three, of pressed metal sectors, indicated in Figure 2 by the reference numerals 40, 41 and 42, the peripheral portions 43, 44 and 45 of which form the outer conical portion of the clutch and to which a clutch lining 47 of suitable material is riveted, as at 48. One of the advantages of fastening the clutch lining to the outer clutch member is that the lining hugs the clutch member to which it is attached under the action of centrifugal force so that there is no tendency when the clutch is disengaged for the lining to drag along the companion clutch member. As best shown in Figure 2, the several sectors making up the driving clutch member are secured, as by bolts 50, to the hub 36 with the sectors spaced apart a small amount in order to impart a certain amount of flexibility to the driving clutch member 35. From Figure 1 it will be noted that the hub 36 of the driving clutch member is provided with a plurality of apertures 52 which cooperate with the apertures 29 in the driven clutch member to promote the desired air circulation through the clutch.

Figure 7:
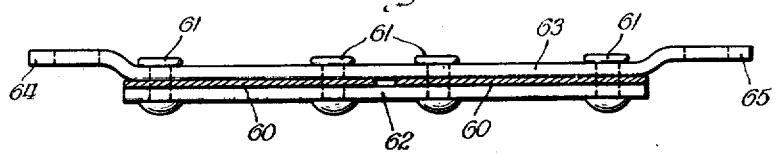
Figure 7 is a section taken substantially along the line 7—7 of Figure 2.

One feature of the present invention embodies the provision of resilient torque transmitting means between the driving member 11 and the driving clutch member 35, and these resilient connections will now be described. A plurality of pairs of elongated generally triangularly shaped resilient plates 60 have their inner ends securely and permanently fastened, as by rivets 61, between two strap members 62 and 63, the latter having extended ends 64 and 65 (Figure 7) that are bent slightly in order to furnish sufficient clearance for the ends of the rivets, and the ends 64 and 65 of the member 63 are apertured to receive the bolts 50 (Figure 2) which, in addition to fastening the associated clutch sectors in position, are also employed to secure the resilient members 60 to the hub of the driving clutch member 35. From the upper portion of Figure 1 it will also be noted that additional bolts 67 are employed for securing the pressed metal sectors of the driving clutch member to the hub 36.

The radially outer or narrow ends of the pairs of resilient plates 60 are apertured and receive rivets 70 which pass through oppositely disposed openings 72 and 73 that are formed in the ends of a tubular or cylindrical sleeve member 74 the ends of which have kerfs 75 to receive the radially outer ends of the resilient members 60, as best indicated in Figures 2, 3 and 5. A generally cylindrical rubber bushing 77, having the form best shown in Figure 3, is provided with an internal bore 78 securely bonded or vulcanized to the sleeve or tubular member 74, and the radially outer portions of each of the rubber bushing members 77 are also bonded or vulcanized to a surrounding cylindrical member indicated in its entirety by the reference numeral 80 and comprising two semi-circular sections 81 and 82 (Figure 4). In their unstressed state each of the rubber bushing members 77 is disposed as shown in Figure 4, with the outer half cylindrical sections 81 and 82 spaced apart, as at 85. During assembly of the clutch, however, these parts 81 and 82 are forced together in any suitable manner so as to initially compress the rubber bushings 77, and each of the rubber bushings is then inserted in a bracket 87 which includes a sleeve section 88 having internal diameter thus sufficient to receive the compressed bushings, the brackets 87 also including ears 89 and 90 which are apertured to receive attaching bolts 91 and 92 which secure the brackets 87 to the rim of the driving element or flywheel 11. From Figure 2 it will be noted that one end of the sleeve section 88 of each of the brackets 87 carries a small flange 95 which cooperates with one end of the outer cylindrical member 80 of the associated rubber bushing to hold the latter against movement in one direction, and a spring ring 96 is adapted to be seated in a groove formed adjacent the other end of the sleeve section 88 to hold the rubber bushing member against movement in the other direction relative to the bracket 87.

As best indicated in Figure 2, the preferred form of clutch embodies three driving clutch sectors, with three pairs of resilient members 60 and three resilient bushing members securely attached to the flywheel or driving element 11. It will be understood, of course, that the number of these parts may vary as desired.

The clutch sectors may be detached, one at a time, by removing the cap screws 50, 91, and 92, and then each sector may be taken out of the housing through the hand hole 19 (Figure 1) after first removing the plate 20. This makes it possible to renew the linings 47 without disassembling the clutch. The clutch sectors may be replaced by inserting the same one at a time through the hand hole 19 and tightening the cap screws 50, 91, and 92. Any of the flexible bushings may be replaced in the same way without having to take the clutch apart.

It will be noted that the bushing members are disposed generally in a circumferential direction, and the principal advantage of this arrangement is that in the transmission of torque the rubber bushings elements 77 are stressed uniformly in shear only, whereby every portion of the rubber bushing inserts are utilized in transmitting the drive. Heretofore, where rubber bushing inserts have been used they are generally disposed transversely with respect to the transmission of torque, so that the rubber inserts are stressed in compression. In this arrangement where the rubber inserts are subjected only to compression, the torque that is transmitted is carried by only a relatively small portion of the rubber insert, the other portions being practically idle and of no utility. According to the present invention, when the engine flywheel 11 is driven, say in a counterclockwise direction as viewed in Figure 2, the driving force is transmitted in a direction which coincides with the axes of the various rubber inserts and the associated cylindrical members bonded thereto. Thus, according to the present invention, the rubber inserts are not subjected locally to compressive stresses but are stressed uniformly and in shear only. It is also noted that the resilient flat members 60, which are preferably formed of spring metal, are disposed in a plane that is coincident with or parallel to the plane of rotation of the driving and driven elements. Thus, these flexible parts 60 are disposed so as to lie in a position offering the greatest strength for the transmission of the torque from the rubber bushing members to the driving member of the clutch unit. As will be clear from Figure 5, disposing the members 60 in this position has the additional advantage that angular misalignment between the axis of the driving member of the clutch and the axis of the driving element 11 is adequately taken care of by the flexing of the members 60 and also by a slight rotation of the inner rubber bushing cylinder or tubular member 74 relative to the outer member which also stresses the rubber inserts in shear only, and generally bodily vertical movement between the clutch members is taken care of by the rubber inserts yielding in compression. Thus, the flexible connection of the driving clutch member to the driving element not only is capable of transmitting the required torque but, at the same time, the driving member of the clutch is free to move in practically any direction, within operative limits, relative to the driving element without in any way affecting the transmission of torque through the clutch to the driven shaft 17. For example, any angular misalignment between the axis of rotation of the driven shaft 17 and the axis of rotation of the crank shaft 10 will be accommodated by flexing of the members 60 and the slight rotation of the inner sleeves of the rubber bushing members relative to the outer sleeves, this type of yielding also serving to accommodate the shifting movement of the driving clutch member relative to the driven clutch member in engaging and disengaging the clutch. It is also possible for the driving and driven elements 10 and 17 to be out of line by displacement while still being parallel, by the yielding of the rubber bushings in compression, as pointed out above. Flexible connections as described above thus permit the driving and driven clutch members when engaged to move absolutely rigidly together entirely independently of any misalignment that may exist between the driving and driven elements. Also, such flexible connections permit the necessary shifting movement of one of the clutch members relative to the other for the purpose of connecting and disconnecting the clutch. The means for shifting the movable clutch member will now be described.

A sleeve member 100 is mounted for sliding axial movement relative to the driven shaft 16 and is provided with a flange 101 which is disposed adjacent the flange 37 on the hub 36 of the driving clutch member 35, the radially inner portions of the clutch sectors 40, 41 and 42 overlying the opposite face of the flange 101, as indicated at 102 in Figures 1 and 2. Preferably, annular cup-shaped thrust rings 103 and 104 are disposed on opposite sides of the flange 101, and the outside diameter of the latter is appreciably less than the inside diameter of the thrust rings 103 and 104, so that there is sufficient clearance, as indicated at 105, to permit a certain amount of transverse movement of the driving clutch member 35 relative to the sleeve 100. The driving clutch member 35 is therefore connected for what might be termed floating movement with respect to both the driving element 11 and the driven element 16 upon which the sleeve 100 and the flange 101 connected to the driving clutch member 35 are mounted.

The sleeve 100 is formed with a radially inwardly extending flange or shoulder 108 against which a clutch loading spring 109 bears at its inner end. The outer end of the spring 109 extends well toward the outer end of the sleeve 100 and engages a collar 111 that is fixed adjacent the outer end of the driven shaft 17 in any suitable manner. The collar 111 is provided with a series of external splines 112 which receive the inwardly directed teeth 114 of a collar 115 that is preferably screwed onto and pinned to the outer end of the sleeve 100. The collar 115 has a radially outwardly extending flange 116 that carries a friction disc 117 which cooperates with a shift collar in serving to retard rotation of the driven parts when the clutch is disengaged. The rear or outer end of the driven shaft 16 is supported in a nose or housing extension 120 of the clutch housing 18 by means of a suitable bearing unit, such as a ball bearing including an outer race 121, a plurality of balls 122, and an inner race 123 which is fastened in place between the collar 111 and a flange 124 on the driven shaft 16. The portion of the latter outwardly of the nose 120 and the flange 124 is arranged in any suitable manner to receive the gear, pulley, or other device or mechanism to be driven when the clutch is engaged.

The shifting of the clutch member 35 into and out of engagement with the driven clutch member 26 may be effected in any desired manner. Preferably, however, the shifting mechanism includes means that is normally disposed out of contact with any of the rotating parts during the time that the clutch is engaged. Referring now more particularly to Figure 1, a collar 130 is mounted within the housing extension 120 of the clutch housing 18 and is formed with an axially extending slot 131 and one or more inclined slots 132. Otherwise, the member 130 is loosely mounted within the housing extension 120 for a shifting movement. An operating lever 135 includes a hub section 136 that is mounted for rocking movement on a shoulder 137 formed on the clutch housing extension 120, and the hub 136 carries an inwardly directed lug 138, preferably in the form of a separate part, extending through a circumferentially directed slot 139 formed in the extension 120 so that the inner end of the member 138 engages in the slot 131 in the sleeve or collar 130 and causes the latter to be turned about the axis of the driven shaft 17 whenever the control lever 130 is rocked. The housing extension 120 is provided with one or more tapered rollers 142 that are mounted on studs 143 suitably fixed, as by a threaded head 144, in position on the extension 120 so as to dispose the rollers in the inclined on angled slots 132. Since the rollers 142 are fixed, rocking of the lever 135 and the corresponding movement of the collar 130, will force the latter to move axially. For example, when the lever 135 is rocked forwardly, out of the plane of the paper in Figure 1, the collar 130 will be shifted to the right and will engage the thrust ring 117 and move the sleeve 100 to the right against the compression of the spring 109, and this movement of the sleeve 100 will shift the clutch member 35 to the right, thereby disengaging it from the driven member 26 fixed to the driven shaft 17. When the control lever 135 is rocked in the other direction, the sleeve or collar 130 is retracted away from the flange 116 on the sleeve 100, thereby permitting the spring 109 to expand and to force the driving clutch member 35 into firm frictional driving engagement with the driven clutch member 26. It is to be noted that as to either the thrust ring 117 or the thrust rings 103 and 104, there is no movable bearing engagement at either point except at times when the clutch is disengaged. For example, when the clutch is engaged, the sleeve 130 is entirely out of contact with the thrust ring 117, and while the flange 101 bears against the thrust ring 103 under the influence of the spring 109, to hold the driving clutch member 35 in firm driving engagement with the driven clutch element 26, yet there is no relative movement between the flang 101 and the hub of the driving clutch member since the driving and driven clutch members rotate as a unit and, by virtue of the above described flexible connections, there is no tendency for either clutch member to be moved relative to the other clutch member when they are engaged. However, in moving into firmly engaged position, the driving clutch member 35 is capable of a limited amount of transverse shifting movement relative to the inner end of the sleeve 100.

For convenience of illustration, in Figure 1 one of the rollers 142 and associated parts have been shown in section although in the preferred construction only two rollers are employed, one in the position indicated in dotted lines in Figure 1 and the other in a position diametrically opposite. From this figure it will also be noted that when the clutch lining is new, the resilient spring elements 60 will be flexed outwardly a certain amount even when the clutch is engaged. However, when the lining begins to wear, the springs will normally occupy a position shown in full lines in Figure 5 when the clutch is engaged, and when the clutch lining becomes quite thin, these flexible elements will occupy a position approximately along the inner broken line, the outer broken line indicating the position shown in Figure 1. Nevertheless, at all times, these flexible elements are capable of accommodating any relative movement between the driving clutch member and the driven element so as to accommodate any misalignment that may exist between the driving and driven elements of the device.

As will be clear from Figure 1 where the splines 112 on the near side of the driven shaft 17 are indicated in dotted lines, the splines 112 are so angled that in the engaging operation, when the frictional drag exerted on the driven sleeve member 100 by the driving clutch member 35 when the latter overruns the driven member 26 and the driven shaft 17, which occurs as the clutch is engaged to drive the load, tends to cause the sleeve 100 to rotate relative to the driven shaft, the sleeve 100 is forced inwardly into firm engagement with the driven clutch member 26. The splines 112 act in a similar manner to aid in releasing the clutch, since now the driven parts 17 and 26 tend to overrun the driving clutch member 35 and associated parts.

Figure 6:
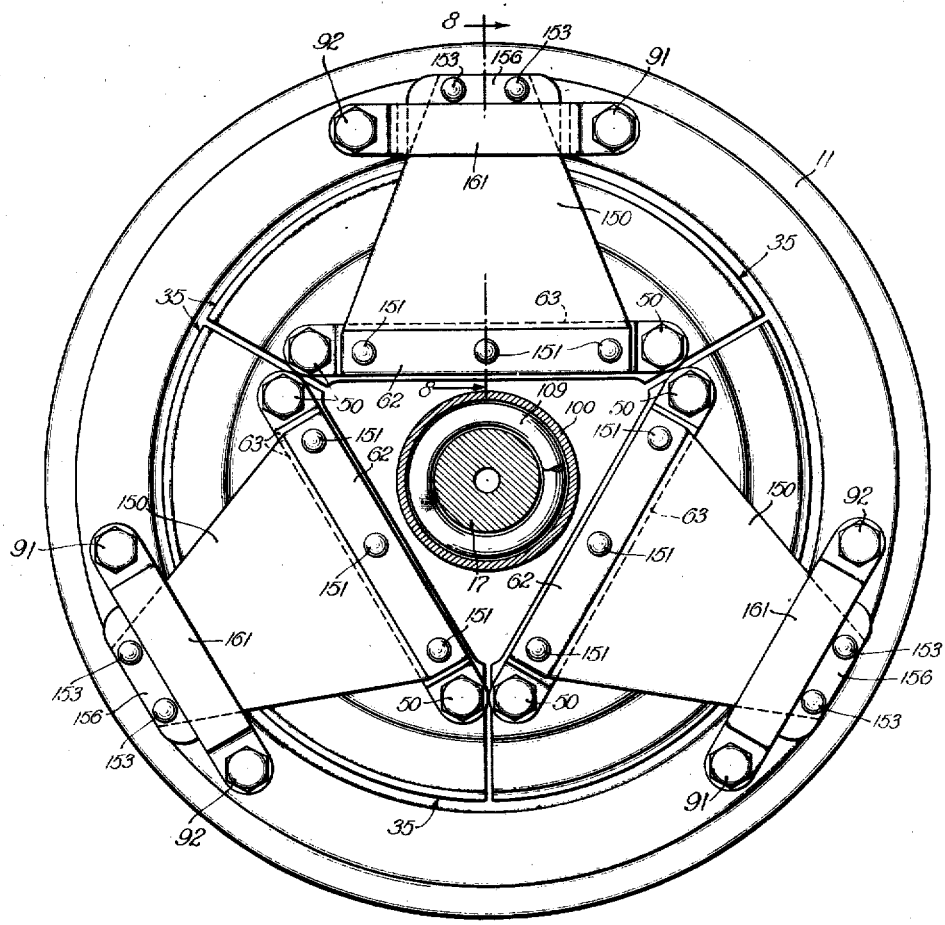
Figure 6 is a view similar to Figure 2 showing a modified form of resilient connection between the driving member of the clutch and the driving element transmitting power to the clutch while accommodating relative movement of both of the clutch members relative to the driving element.

A somewhat simplified form of the present invention is illustrated in Figure 6 in which the resilient connections between the driving clutch member 35 and the flywheel or driving element 11 takes the form of three generally triangular shaped flat spring members connected by rectangular blocks of rubber acting in shear to the driving element 11. Referring now more particularly to Figures 6, 8, 9 and 10, each of the flexible connecting elements includes a resilient plate 150 of generally triangular formation and secured by rivets 151 to the plates 62 and 63 described above. The outer end of each of the resilient plates 150 is riveted, as at 153, to a pair of plates 155 and 156 (Figures 8 and 9). A block of rubber 158 is bonded at one side to the plate 155, and a second block of rubber 159 is bonded to the other plate 156, and members 160 and 161 are, in turn, bonded to the outer faces of the rubber blocks 158 and 159, respectively. Each of the members 160 and 161 is formed with a pair of ears 162 and 163 bent inwardly so as to lie adjacent one another when the unit is assembled, as thus shown in Figure 9. Tubular bushings 164 and 165 are provided with reduced ends 167 (Figure 9) which are inserted into the openings 168 and 169 that are formed in the pairs of ears 162 and 163, and after the ends 167 are inserted, the bushings 164 and 165 are staked or riveted over, as indicated at 170, so as to hold the rubber bushing unit in assembled relation. Also, the parts are so proportioned that when the bushings 164 and 165 are riveted in place, the rubber blocks 158 and 159 are subjected to initial compression, as indicated in Figure 9. The several rubber bushing units, connecting the outer ends of the plates 150 to the driving element 11, are preferably fastened to the latter in substantially the same manner as is illustrated in Figure 2, namely, by bolts or cap screws 91 and 92.

The resilient unit just described operates in substantially the same manner as the unit shown in Figures 1 and 2 in transmitting torque from the driving element 11 to the driving clutch member 35 while accommodating practically universal movement of the latter with respect to the driving element so as to prevent any misalignment between the driving and driven elements from adversely affecting the rigid and firm engagement of the clutch members when the clutch is engaged for transmitting torque from the driving to the driven element. The plate members 150 are capable of flexing in the same manner as the plates 60 described above and illustrated in Figure 5, and the two rubber blocks 158 and 159 in each unit act wholly in shear, like the rubber bushings 77, in transmitting the torque from the driving element 11 to the driving clutch member 35 and in accommodating angular deflection and flexure of the associated plate member 150. The construction shown in Figures 8 and 9 also includes the advantage of accommodating any bodily displacement of the driving clutch member 35 relative to the driving element 11 in a transverse direction by yielding in shear.

It is to be noted from Figure 1 that when the clutch is to be disengaged, a shiftable part is brought up against a flange on the shiftable sleeve that rotates with the driven element, and that this shiftable part is held against rotation, whereupon a contact at this point serves as a brake against any spinning of the driven parts. However, when the clutch is engaged there is no contact at all between the nonrotatable part and the flange on the shiftable sleeve carried by the driven element. Similarly, the action of the loading spring in forcing the shiftable sleeve (to the left in Figure 1) to hold the driving and driven clutch members rigidly together, acts through thrust rings or bearings which are required to accommodate relative rotation only at times when the clutch is disengaged; when the clutch is engaged all of these parts rotate together and there is no relative rotation between the driving clutch member, the thrust rings, or the corresponding portion of the shiftable sleeve. By virtue of this construction, the clutch is long lived.

It is important to note that in the form of clutch controlling mechanism shown in Figure 1 when it is desired to disassemble the clutch for any reason, as to reline the driving clutch element 35, there is no danger of the loading spring from flying out of position when the clutch parts are removed from the housing, for when the clutch parts are disassembled and the sleeve 100 and spring 109 removed from the driven shaft 16, the outer end of the spring expands until it engages the teeth 114 on the collar 115, but no further expansion can take place, and hence the driving clutch member 35 and the sleeve 100 and spring 109 can be handled as a unit with the spring 109 held in proper position.

While I have shown and described above the preferred structures embodying the principles of the present invention, it will be understood that my invention is not to be limited to the specific details shown and described above, but that, in fact, widely different means may be employed in the practice of the broader aspects of my invention.

What I claim, therefore, and desire to secure by Letters Patent is:

1. Clutch mechanism comprising driving and driven parts, a pair of relatively movable clutch members adapted to be engaged and to rotate together to transmit the drive from the driving part to the driven part, means rigidly connecting the driven clutch member to said driven part so as to rotate therewith and to take any misaligned position that said part takes with respect to the driving part, and means for connecting the driving clutch member to said driving part including a plurality of radially extending circumferentially disposed flexible plates secured at their radially inner portions to said driving clutch member and extending radially outwardly to points of attachment to said driving part.

2. Clutch mechanism comprising driving and driven parts, a pair of relatively movable clutch members adapted to be engaged and to rotate together to transmit the drive from the driving part to the driven part, means rigidly connecting one of said clutch members to one of said parts to rotate therewith and to take any misaligned position that said one part takes with respect to the other part, a plurality of radially extending circumferentially disposed flexible plates secured at their radially inner portions to the other of said clutch members and extending outwardly to points adjacent the other of said driving and driven parts, a plurality of pairs of elements, one element of each pair being fixed to said other part and the other element of each pair being fixed to the outer end of each of said flexible plates, said elements extending generally in a circumferential direction, and rubber inserts bonded to said elements and acting wholly in shear to transmit driving torque from the driving part to the driven part through said flexible plates and said engaged clutch members, said flexible plates accommodating engaging and disengaging movements of one of said clutch members with respect to the other and the yielding of said rubber inserts in shear serving to introduce a limited amount of torsional flexibility between said driving and driven parts when said clutch members are engaged.

3. In a clutch mechanism, the combination of a driving part, driving, and driven clutch members adapted to be engaged to transmit the entire driving torque and to move together relative to said driving part, and torque transmitting means disposed between said driving part and said driving clutch member and including a pair of elements having a mass of rubber bonded thereto, means securing one of said elements to one of said clutch members, and means for fastening the other element to said driving part and including means subjecting said bonded rubber to initial compression.

4. In a clutch mechanism, the combination of a driving part, driving and driven clutch members adapted to be engaged and to move together relative to said driving part, and torque transmitting means disposed between said driving part and said driving clutch member and including a flexible metallic plate fixed at one end to said driving clutch member, a pair of elements having a mass of rubber bonded thereto, one of said elements being carried by said resilient metallic plate, and means for fastening the other element to said driving part and including means subjecting said bonded rubber to initial compression, said elements and said bonded rubber being disposed in a generally circumferential direction so as to transmit torque from said driving part to said driving clutch member through said resilient metallic plate and said rubber with the latter acting wholly in shear to transmit said torque.

5. Cone clutch mechanism adapted to connect a driven shaft to a driving flywheel and comprising a pair of interengageable cone clutch members, one being adapted to be rigidly secured to said driven shaft and the other axially shiftable into and out of engagement with said one clutch member, and means flexibly connecting said other cone clutch member with said driving flywheel so as to transmit torque from the latter to said clutch members while accommodating any misalignment between said flywheel and the driven shaft, and providing for movement of said clutch members together in engaged position relative to said flywheel.

6. In a cone clutch mechanism, the combination of a driving member, a driven shaft, a pair of cone clutch members, one being fixedly connected to the end of said driven shaft adjacent said driving member, the other of said cone clutch members including a hub section and a pressed metal cone clutch element carried by said hub and engageable with said driven clutch member when moved axially of said driven shaft, and flexible torque transmitting means connecting said driving member and said other cone clutch member and accommodating relative movement of the latter with said driven clutch member relative to said driving member so as to accommodate any misalignment between the latter and the driven shaft.

7. In a cone clutch mechanism, the combination of a driving member in the form of a recessed flywheel, a driven shaft, a cone clutch member disposed generally in the recess of said flywheel, a flat flexible member disposed in a radial position relative to the axis of rotation of said driving member and serving to connect said clutch member with the rim portion of said driving flywheel for rotation therewith and accommodating angular misalignment and radial and axial displacement of the driven shaft relative to said flywheel, and a driven member fixed to said driven shaft and serving as a companion cone clutch element adapted to be engaged with said first clutch element for driving said shaft from said driving flywheel.

8. A clutch mechanism comprising driving and driven members, a pair of engageable clutch parts, one being rigidly connected with one of said members, and means including a flat flexible element and a rubber bushing connecting the other of said clutch parts to the other of said members, said flexible element serving to accommodate angular and axial displacement and said rubber bushing serving to accommodate radial and rotational displacement between said driving and driven members when said clutch parts are in firm engagement.

9. Clutch mechanism comprising the combination of a driving element, a driven shaft, a driven clutch member rigidly connected thereto, a driving clutch member adapted to engage and drive said driven clutch member and carried by said driven shaft for relative shifting movement with respect to said driving element so as to accommodate misalignment between the latter and said driven shaft, and an axially shiftable sleeve surrounding the driven shaft for shifting said driving clutch member into and out of engagement with said driven clutch member and having a flange operatively connected with said driving clutch member for both rotary and radial movement relative thereto.

10. A clutch unit adapted to be connected to a driving element, comprising a driven shaft, a driven clutch member fixed to said shaft, a driving clutch member adapted to be engaged with and to move with said driven clutch member, a sleeve surrounding said driven shaft and connected to shift said driving clutch member in one direction and to rotate with respect to said driving clutch member, spring means acting between said driven shaft and said sleeve for forcing said driving clutch member into engagement with said driven clutch member, means separate from said spring means for causing said sleeve to rotate with said driven shaft, and means flexibly connecting said driving clutch member to said driving element.

11. A clutch unit adapted to be connected to a driving element, comprising a driven shaft, a driven clutch member fixed to said shaft, a driving clutch member adapted to be engaged with and to move with said driven clutch member, a sleeve surrounding said driven shaft and connected at its inner end to shift said driving clutch member in one direction and to rotate with respect to said driving clutch member, spring means disposed within said sleeve and acting at its outer end against said driven shaft and at its inner end against said sleeve for forcing said driving clutch member into engagement with said driven clutch member, means flexibly connecting said driving clutch member to said driving element, a radially outwardly disposed flange carried at the outer end of said sleeve adjacent the outer end of said spring means, and means normally out of engagement with said flange and adapted to move into engagement therewith and to shift said sleeve to disengage said driving clutch member from said driven clutch member.

12. A clutch unit comprising a driven shaft, driving and driven clutch members, the driven clutch member being connected to rotate with said driven shaft, a sleeve surrounding said driven shaft and having means serving as an inturned flange at its inner end, said sleeve being keyed to rotate with and to be shiftable axially of said shaft, one of said clutch members being mounted for axial movement and operatively connected to be shifted axially by said sleeve, the internal diameter of the latter being greater than the diameter of said driven shaft, a spring surrounding the latter and disposed within said sleeve, said spring having its inner end bearing against the inturned flange on said sleeve for shifting the latter to bring said clutch members into engagement, and means on the driven shaft for receiving the outer end of said spring.

13. A clutch unit comprising a driven shaft, driving and driven clutch members, the driven clutch member being connected to rotate said driven shaft, a sleeve surrounding said driven shaft and having means serving as an inturned flange at its inner end, one of said clutch members being mounted for axial movement and operatively connected to be shifted axially by said sleeve, the internal diameter of the latter being greater than the diameter of said driven shaft, a spring surrounding the latter and disposed within said sleeve, said spring having its inner end bearing against the inturned flange on said sleeve for shifting the latter to bring said clutch members into engagement, and means on the outer end of said sleeve for receiving the outer end of said spring to prevent its release when said sleeve and spring are detached from said driven shaft.

14. A clutch unit adapted to be detachably connected to a driving element, comprising a driven shaft, a driven clutch member rigidly fastened thereto, a sleeve having a splined connection with said driven shaft and slidable along the latter, a driving clutch member adapted to be shifted axially relative to said driven clutch member by said sleeve, means carried by said driving clutch member for establishing a resilient torque transmitting connection between said driving element and said driving clutch member so as to provide for movement of the latter with the driven clutch member relative to said driving element to accommodate misalignment between the latter and said driven shaft, and means engageable with said sleeve for shifting the latter along the splines upon said driven shaft, said movement of the sleeve serving to shift said driving clutch member into and out of engagement with said driven clutch member.

15. A clutch unit adapted to be detachably connected to a driving element, comprising a driven shaft, a driven clutch member rigidly fastened thereto, a driving clutch member detachably connected to said driving element, a sleeve embracing said driven shaft and having at one end a rotatable connection with said driving clutch member for shifting the latter axially of said driven shaft, a collar having external splines mounted on the driven shaft, a companion collar fixed to the other end of said sleeve and having a series of inwardly directed spline teeth adapted to engage said external splines for causing said sleeve to rotate with said driven shaft but accommodating axial movement of said sleeve relative to the driven shaft, and spring means disposed about said driven shaft within said sleeve and biased to act against the latter and to react against said splined collar for bringing said clutch members into engagement, the outer end of said spring being engageable with the spline teeth at the outer end of said sleeve to limit the expansion of said spring when said sleeve and associated parts are removed from said driven shaft.

16. In a clutch mechanism embodying a driving element and a member adapted to be driven therefrom and capable of movement relative thereto in a plurality of directions, the combination of a resilient member fixed at one end to said clutch member and capable of transmitting torque to the latter in one direction, a generally cylindrical part fixed to the outer end of said resilient member, a cylindrical rubber bushing having an interior bore receiving and bonded to said generally cylindrical part, a second cylindrical part embracing the exterior portion of said rubber bushing and bonded to the latter, and means fixing said second cylindrical part to said driving element with the axis of said rubber bushing and cylindrical members extending in the direction in which said resilient member is capable of transmitting torque, whereby said torque is transmitted from said driving element to said resilient member by said rubber bushing acting in shear, the angular flexing of said resilient member in a direction at right angles to said one direction and the yielding of said rubber bushing in shear to permit a limited rotation of said inner cylindrical member relative to the outer cylindrical part accommodating axial shifting of said clutch member relative to said driving element, and the yielding of said rubber bushing under compression accommodating bodily movement of said clutch member relative to the driving element in a direction transverse to the axes thereof.

17. A clutch mechanism for power take-offs and the like, comprising a housing, a pair of clutch members movable axially therein relative to one another, a control lever disposed exteriorly of said housing and movable in a single transverse plane about the axis of rotation of said members, a cam ring disposed within said housing, means by which said cam ring is rotated by said lever, means fixed against rotation within said housing and having a camming connection with said ring for causing the latter to shift axially when said lever is rocked, and means within said housing shifted by axial movement of said ring for shifting one of said clutch members axially.

18. A clutch mechanism for power take-offs and the like, comprising a housing, a pair of clutch members movable axially relative to one another, a control lever rockable about the axis of rotation of said members in the exterior of said housing, a cam ring disposed within the housing and rotated by said lever, and means carried by and fixed against rotation with respect to said housing and having a camming connection with said ring for causing the latter to shift axially when said lever is rocked, and means shifted by axial movement of said ring for shifting one of said clutch members axially.

19. A clutch mechanism for power take-offs and the like, comprising a housing, a pair of clutch members movable axially relative to one another within said housing, a control lever movable about a portion of said housing transversely thereof about the axis of rotation of said members, said portion of the housing being slotted, lug means carried by said control lever and extending through the slotted portion of said housing, a cam ring mounted within said portion of said housing and receiving said lug means so as to be rotated by said lever, there being slots cut at an angle on the periphery of said ring, fixed studs carried by said portion of the housing and engaging in said slots so as to cause said ring to be shifted axially when said lever is rocked about said axis, and means shifted by axial movement of said cam ring for shifting one of said clutch members axially.

20. In a clutch, a housing having an extended nose section provided with a circumferentially slotted portion, a driven shaft journaled in said section, a pair of relatively movable clutch members disposed in said housing, a lever mounted for transverse rocking movement on said housing nose section and including means directed radially inwardly through said slotted portion, studs fixed to said housing nose section and extending radially inwardly thereof, a cam member disposed within said nose section and engaging said fixed studs and said lever carried means so that when the latter is rocked said member is shifted axially, and means connecting said member with one of said clutch members whereby said lever controls said one clutch member.

21. A clutch unit adapted to be connected to a driving element, comprising a driven shaft, a driven clutch member fixed to said shaft, a driving clutch member rotatable with said driving element and adapted to be engaged with and to move with said driven clutch member, an axially shiftable member surrounding said driven shaft and having a rotatable connection with said driving clutch member to shift the same axially relative to said driven clutch member, means for shifting said axially shiftable member, and means establishing a longitudinal helically splined connection between said axially shiftable member and said driven shaft for utilizing the rotation of said driving clutch member for tending to shift said driving clutch member axially.

22. In a clutch mechanism, the combination of a driving part, driving and driven clutch members adapted to be engaged and to move together relative to said driving part, and torque transmitting means disposed between said driving part and said driving clutch member and including a flexible metallic plate fixed at one end to said driving clutch member, a pair of elements having a mass of rubber bonded thereto, one of said elements being carried by said resilient metallic plate, and means for fastening the other element to said driving part, said elements and said bonded rubber being disposed in a generally circumferential direction so as to transmit torque from said driving part to said driving clutch member through said resilient metallic plate and said rubber with the latter acting wholly in shear to transmit said torque.

23. A clutch unit comprising a driven shaft, driving and driven clutch members, the driven clutch member being connected to rotate with said driven shaft, a sleeve surrounding said driven shaft and having means serving as an inturned flange at its inner end, helical spline means connecting the outer end of said sleeve to cause the latter to rotate with and to be shiftable axially of said driven shaft, one of said clutch members being mounted for axial movement and operatively connected to be shifted axially by said sleeve, the internal diameter of the latter being greater than the diameter of said driven shaft, and a spring surrounding the latter and disposed within said sleeve, said spring having its inner end bearing against the inturned flange on said sleeve for shifting the latter to bring said clutch members into engagement and its outer end reacting against the driven shaft.

24. A clutch unit comprising a driven shaft, driving and driven clutch members, the driven clutch member being connected to rotate said driven shaft, a sleeve surrounding said driven shaft and having means serving as an inturned flange at its inner end, one of said clutch members being mounted for axial movement and operatively connected to be shifted axially by said sleeve, the internal diameter of the latter being greater than the diameter of said driven shaft, a spring surrounding the latter and disposed within said sleeve, said spring having its inner end bearing against the inturned flange on said sleeve for shifting the latter to bring said clutch members into engagement, means on the driven shaft for receiving the outer end of said spring, there being means serving as a flange on the outer end of said sleeve, and shift mechanism disposed about said sleeve inwardly of last mentioned flange and adapted to engage the latter for compressing the spring when shifting said one clutch member.

25. A clutch unit adapted to be detachably connected to a driving element, comprising a driven shaft, a driven clutch member rigidly fastened thereto, a driving clutch member detachably connected to said driving element, a sleeve embracing said driven shaft and having at one end a rotatable connection with said driving clutch member for shifting the latter axially of said driven shaft, a collar having external splines mounted on the driven shaft, and a companion collar fixed to the other end of said sleeve and having a series of inwardly directed spline teeth adapted to engage said external splines for causing said sleeve to rotate with said driven shaft but accommodating axial movement of said sleeve relative to the driven shaft.

26. A clutch unit adapted to be detachably connected to a driving element, comprising a driven shaft, a driven clutch member rigidly fastened thereto, a driving clutch member detachably connected to said driving element, a sleeve embracing said driven shaft and having at one end a rotatable connection with said driving clutch member for shifting the latter axially of said driven shaft, a collar having external splines mounted on the driven shaft, a companion collar fixed to the other end of said sleeve and having a series of inwardly directed spline teeth adapted to engage said external splines for causing said sleeve to rotate with said driven shaft but accommodating axial movement of said sleeve relative to the driven shaft, and spring means for urging said driving clutch member in one direction.

27. A clutch unit adapted to be detachably connected to a driving element, comprising a driven shaft, a driven clutch member rigidly fastened thereto, a driving clutch member detachably connected to said driving element, a sleeve embracing said driven shaft and having at one end a rotatable connection with said driving clutch member for shifting the latter axially of said driven shaft, a collar having external helical splines mounted on the driven shaft, a companion collar fixed to the other end of said sleeve and having a series of inwardly directed helical spline teeth adapted to engage said external splines for causing said sleeve to rotate with said driven shaft but accommodating axial movement of said sleeve relative to the driven shaft, and spring means acting against said sleeve for shifting said clutch member in one direction, said helical splines and spline teeth acting to tend to shift said sleeve whenever the sleeve tends to rotate relative to the driven shaft.

28. In combination, a flywheel having a recess therein, a driven shaft mounted for rotation axially of said flywheel, a clutch member fixed to the inner end of said driven shaft and disposed within the recess of said flywheel, a companion clutch member also disposed in said recess and shiftable axially of the driven shaft into and out of driving engagement with said first mentioned clutch member, means including a generally flat flexible coplanar member fixed at its radially inner portion to the axially outer portion of said shiftable clutch member and at its radially outer portion to said flywheel adjacent the axially outer portions of the recess therein, and means for moving said shiftable clutch member into and out of engagement with said driven clutch member, said movement being accommodated by the flexibility of said flexible member.

CLARENCE M. EASON.

CERTIFICATE OF CORRECTION.

Patent No. 2,126,760. August 16, 1938.

CLARENCE M. EASON.

It is hereby certified that error appears in the printed specification of the above numbered patent requiring correction as follows: Page 7, second column, line 44, claim 18, for the word "in" read on; and that the said Letters Patent should be read with this correction therein that the same may conform to the record of the case in the Patent Office.

Signed and sealed this 11th day of October, A. D. 1938.

Henry Van Arsdale (Seal) Acting Commissioner of Patents.

tioned clutch member, means including a generally flat flexible coplanar member fixed at its radially inner portion to the axially outer portion of said shiftable clutch member and at its radially outer portion to said flywheel adjacent the axially outer portions of the recess therein, and means for moving said shiftable clutch member into and out of engagement with said driven clutch member, said movement being accommodated by the flexibility of said flexible member.

CLARENCE M. EASON.

CERTIFICATE OF CORRECTION.

Patent No. 2,126,760.                                August 16, 1938.

CLARENCE M. EASON.

It is hereby certified that error appears in the printed specification of the above numbered patent requiring correction as follows: Page 7, second column, line 44, claim 18, for the word "in" read on; and that the said Letters Patent should be read with this correction therein that the same may conform to the record of the case in the Patent Office.

Signed and sealed this 11th day of October, A. D. 1938.

Henry Van Arsdale (Seal)                                Acting Commissioner of Patents.